Nov. 7, 1933.  J. BIJUR  1,933,582
LUBRICATION
Filed Sept. 12, 1929   3 Sheets-Sheet 1
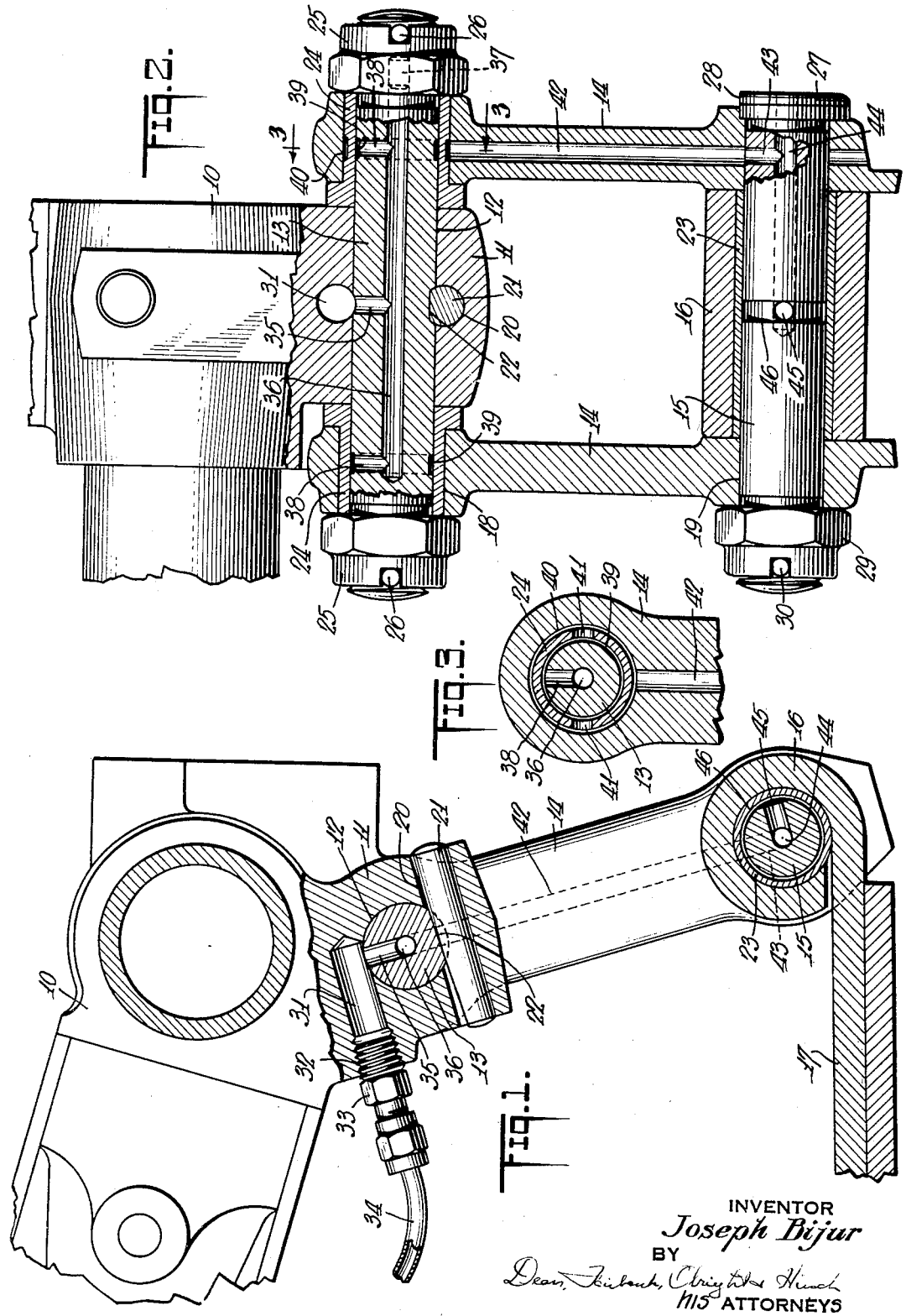
INVENTOR
*Joseph Bijur*
BY
*HIS* ATTORNEYS Nov. 7, 1933.  J. BIJUR  1,933,582
LUBRICATION
Filed Sept. 12, 1929   3 Sheets-Sheet 2
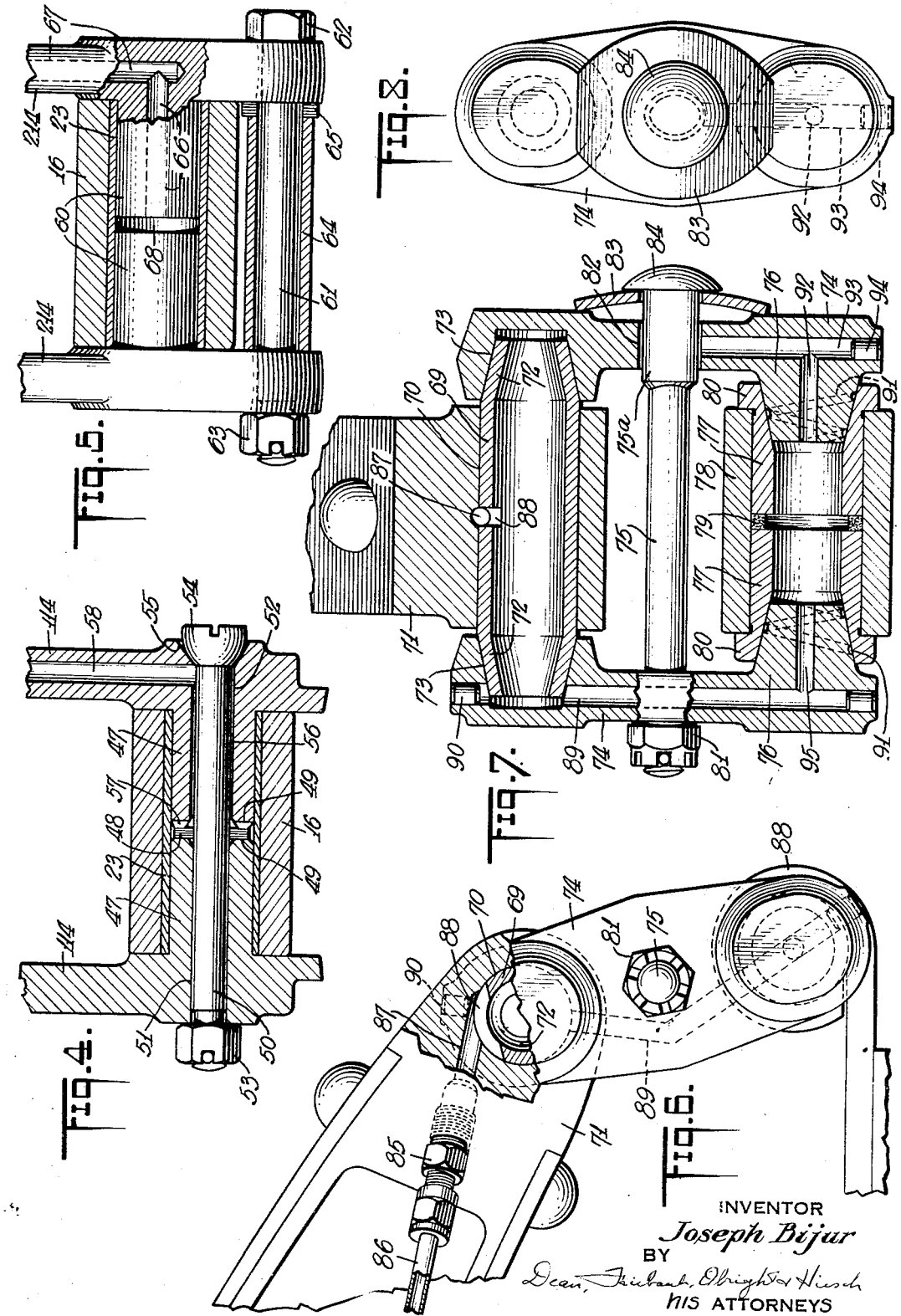
INVENTOR
*Joseph Bijur*
BY
*Dean, Fairbank, Obright & Hirsch*
HIS ATTORNEYS Nov. 7, 1933.                J. BIJUR                1,933,582
                            LUBRICATION
                    Filed Sept. 12, 1929        3 Sheets-Sheet 3
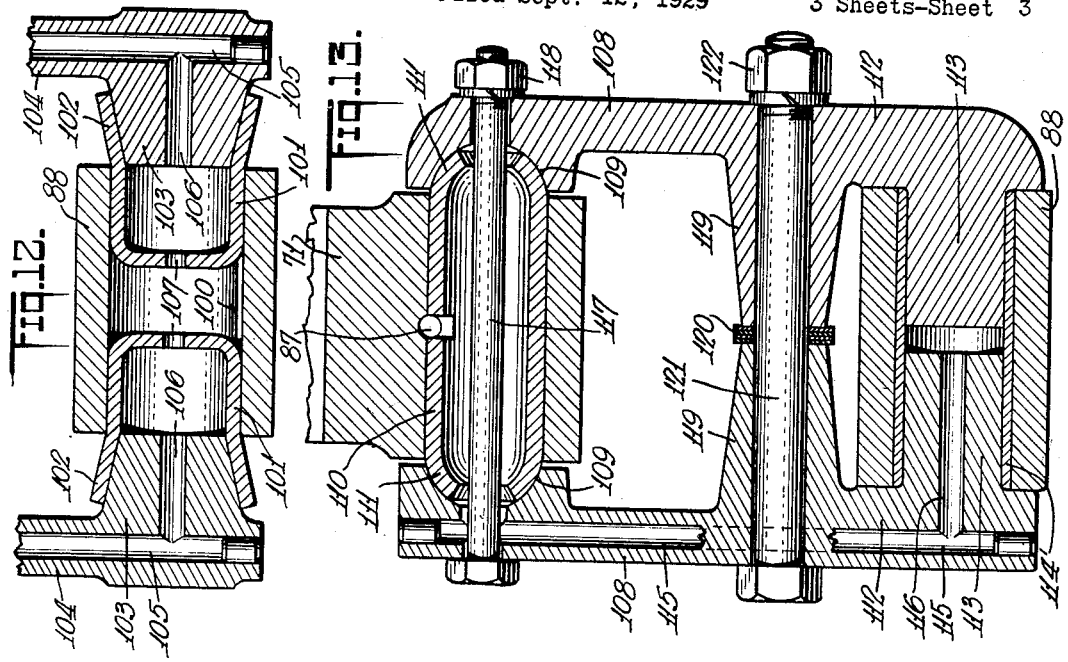
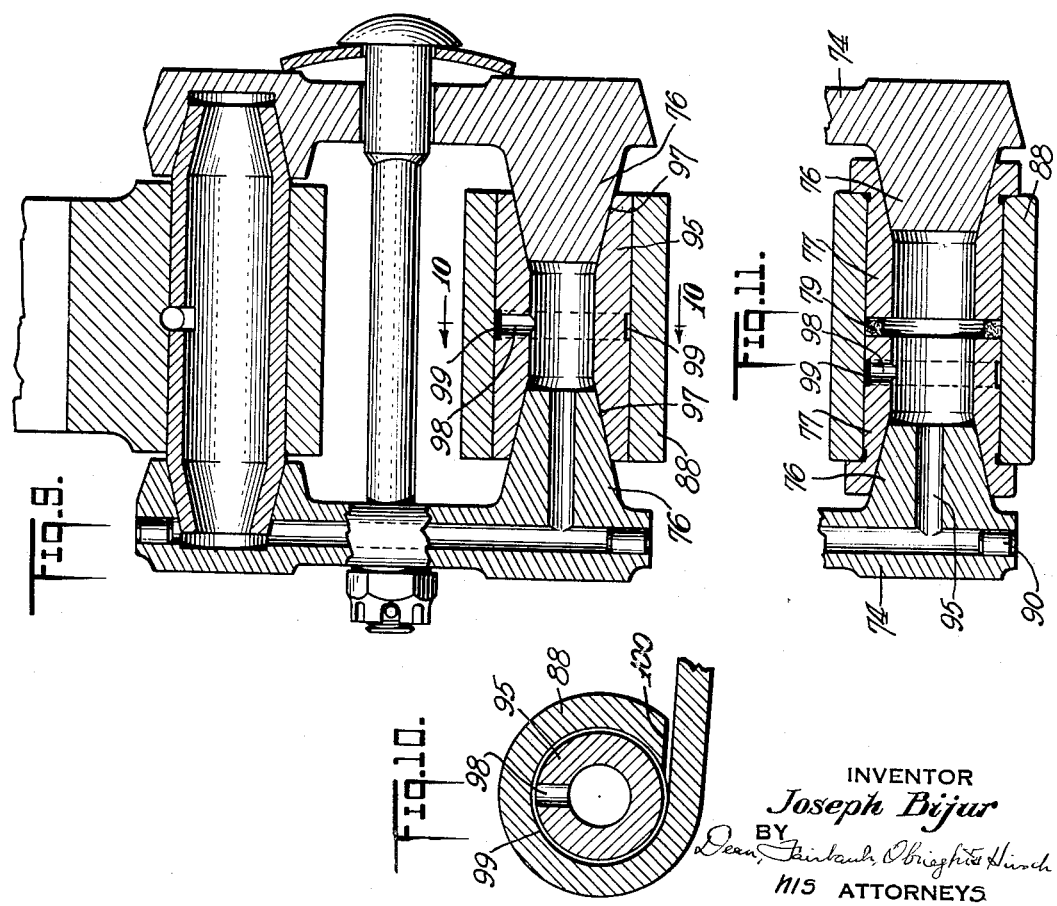
INVENTOR
Joseph Bijur
BY
HIS ATTORNEYS Patented Nov. 7, 1933

1,933,582

UNITED STATES PATENT OFFICE 1,933,582

LUBRICATION

Joseph Bijur, New York, N. Y., assignor to Auto Research Corporation, a corporation of Delaware Application September 12, 1929
Serial No. 392,048

35 Claims. (Cl. 267—54)

My present invention is capable of a wider range of applicability although concerned primarily with shackles of the character employed to connect a vehicle body to its supporting springs and with the lubrication of such shackles.

Such shackles ordinarily include a substantially rigid structure part having spaced horizontal swivel bearing connections with the load (chassis frame) and the load support (shock absorbing spring) respectively, the shackle whether of the tension or compression type, serving as a load transmitting element to movably support the frame upon the spring. One of the difficulties encountered in the lubrication of many shackles of this type is the normal tendency of the lubricant at least at one of the bearings to flow away or escape from between those parts of the surfaces that sustain the load.

An object of the present invention is so to construct the shackle and so to connect it with respect to the load and support that each swivel bearing is loaded at the side towards which oil normally tends to flow by gravity and the problem of shackle lubrication is reduced to the comparatively simple one of getting lubricant to the bearings rather than keeping it on surfaces from which it naturally tends to escape.

Other objects are to accomplish this result without resorting to the use of complex construction or accessory oil fittings, and without sacrificing ruggedness, compactness, strength or durability.

Another object is to provide a shackle of this character capable of lubrication by hand oiling or otherwise and well adapted for use in conjunction with a centralized chassis lubricating system of either the intermittent "shot" type or the continuous slow feed type.

In a preferred embodiment of the invention each shackle includes two spaced swivel bearings, each bearing consisting of complementary inner and outer (male and female) relatively rotating bearing parts. The bearings are so connected to the load and load support that the weight of the load is transmitted to the support through the under surfaces of the bearings toward which oil normally tends to flow by gravity.

Such connection may be readily effected regardless of the nature of the bearings by fixedly connecting the inner element of one bearing to the load, and its outer element to the rigid structure part of the shackle and fixedly connecting the outer element of the other bearing to the support and is complementary inner element to the rigid structure part of the shackle.

Thus the inner element of the bearing which is attached to the load will transmit such load through the bottom of its encircling complementary member to the rigid structure part of the shackle and such part in turn will transmit the load through the inner element of the other bearing to the bottom of its complementary outer element which is fixed to the support.

Preferably one bearing is supplied with oil by overflow from the other. In the case of tapered bearings which are self-adjusting to accommodate for wear and which are substantially self sealing against entry of air, means is provided to prevent the possibility of any air blocking such as might retard or oppose the desired flow of oil.

The invention may be more fully understood from the following description in connection with the accompanying drawings, wherein:

Fig. 1 is a view mainly in vertical section through one of my improved shackles, showing the same in operative position between a chassis frame and its spring.

Fig. 2 is a view mainly in vertical section through the shackle and associated parts taken approximately at right angles to Fig. 1.

Fig. 3 is a fragmentary view in transverse section on the line 3—3 of Fig. 2.

Fig. 4 is a vertical sectional view through the lower end of a modified form of shackle.

Fig. 5 is a view partly in section and partly in elevation of the lower end of a shackle exemplifying a further modification.

Fig. 6 is a view mainly in side elevation but partly in section of a type of shackle employing tapered bearings, and showing the shackle in applied position.

Fig. 7 is a view mainly in vertical section through the shackle of Fig. 6 and its associated parts.

Fig. 8 is a side elevational view of this shackle showing the side opposite to the side shown in Fig. 6.

Fig. 9 is a view similar to Fig. 7 but showing a further modification.

Fig. 10 is a transverse sectional detail on the line 10—10 of Fig. 9.

Figs. 11 and 12 are longitudinal sectional details through the lower ends of further modified types of shackles, and Fig. 13 is a view similar to Fig. 9 but showing still another modification.

Referring first to Figs. 1 to 3 of the drawings, the reference numeral 10 designates the rear end of a channelled chassis frame bar, having a horn or extension 11 transversely bored at 12 for the reception of the upper pivot bolt 13 of the shackle. This bolt is connected by parallel rigid links 14, 14 with the lower bolt 15 which extends through a suitable eye 16 in the end of the supporting leaf spring 17 of the vehicle. The links 14 are provided with upper eyes 18 to receive the upper pivot bolt 13 and with lower eyes 19 to receive the lower pivot 15.

In accordance with the principles of the present invention, the load, in this case represented by member 10 is fixed to the upper bolt 13 and the lower bolt 15 is turnable relatively to the support or spring eye 16. To accomplish this, bolt 13 is keyed against rotation in bore 12 by a wedge pin 21 driven through a transverse passageway 20 in the horn 11 and wedging against a transverse flat 22 in the lower side of bolt 13 at the intermediate portion of the latter. The lower bolt 15 is turnable in a bushing member 23 force fitted into the spring eye 16.

Bushings 24 force fitted in the link eyes 18 include flanged-over ends abutting the flat side faces of horn 11. These bushings serve as the complementary outer bearing elements for bolt 13, receiving the projecting ends of such bolt. The extremities of the bolt 13 are preferably threaded and apertured for the reception of lock nuts 25 and associated lock pins 26. Lower bolt 15 is held against turning within the link eyes 19 by the use of a head 27 flattened at 28 to fit a corresponding shoulder in the outer face of one link 14. The other end of bolt 15 is secured by lock nut 29 and crosspin 30 corresponding to the securing means for the ends of the bolt 13.

From the foregoing it will be seen that the lower or under side of each swivel bearing is the loaded side thereof. Bolt 13 rigidly fixed to the load transmits the weight thereof through its under side to the lower parts of bushings 24. These bushings being rigid relative to links 14 and bolt 15 the load is transmitted through the lower side of bolt 15 to the lower part of bushing 23. Thus at both the upper and lower swivel bearings, oil applied between the bearing surfaces will tend to gravitate toward the lower sides thereof, that is, to the place where it is required. In consequence it is merely necessary to supply adequate lubricant between surfaces of the bolts and their complementary bushings to insure proper lubrication thereof without danger of dry spots at the loaded bearing areas such as might occur due to normal gravity flow were the upper side of the bearing loaded.

The present shackle might be hand oiled or lubricated from a grease cup but it is preferably designed for oiling from a centralized lubricating system. With this in view, a dead end oil inlet passageway 31 extending transversely of horn 11 has a socket 32 into which a drip plug 33 such as that disclosed in my prior Patent No. 1,632,772 dated June 14, 1927 may be applied. This drip plug is coupled to and fed from a conduit 34 forming part of a centralized pressure distributing system.

The passageway 31 intersects bore 12 and communicates with an upstanding radial passageway 35 in bolt 13, leading to a longitudinal dead end bore 36 in the bolt. Bore 36 is plugged at 37 at its otherwise open end, and near its end is intersected by upwardly extending radial bores 38 opening into annular grooves 39 in bolt 15 which are disposed within the bushings 24 and supply the necessary oil to lubricate the upper swivel bearings 13—24.

To supply the lower swivel bearings 15—23, one of the bushings 24 is also formed with an external annular groove 40, concentric with groove 39 and communicating therewith through overflow ports 41. A longitudinal oil passageway 42 in corresponding link 14 connects groove 40 with radial passageway 43 in lower bolt 15. Passageway 43 leads to a longitudinal closed end bore 44 in the bolt 15 whence oil escapes laterally through radial ports 45 and flows into an annular groove or channel 46 encircling the bolt 15 and lubricates the lower swivel bearing.

Thus as oil flows into passageway 31, both upper and lower swivel bearings will be lubricated by gravity drainage, the lower bearing being supplied by overflow from the upper one. Oil flows through port 35, filling bore 36, rising in ports 38 and spilling over into grooves 39 to oil the upper bearings. Overflow from one channel 38 escapes through ports 41 draining through groove 40 and passageways 42 and 43 into bore 44 whence it flows through ports 45 to groove 46 and oils the lower bearing.

Fig. 4 illustrates a modified form of construction in which the bolt 15 is replaced by axially aligned hollow stud bolts 47 integral with the lower ends of links 114 and projecting into the bushing 23 of the spring eye 16. In order to take up wear, laminated shims 48 are arranged between projecting shoulder abutments 49 at the adjacent stud bolt ends. The lower ends of the links 114 are connected by a bolt 50 passing through the aligned bores 51 and 52 in the stud bolts 47 and secured by lock nut 53. The rounded head 54 of this bolt fits into a counter-sunk recess 55 in the outer face of the right-hand link. Bore 52 is slightly larger in diameter than the bolt 50, providing an annular oil flow passageway 56 from which oil flows through notches 57 in the shoulder 49 to lubricate the bearing surfaces between bushing 23 and stud bolts 47. The construction of the upper end of this bolt may be similar to that of Figs. 1 to 3, overflowing oil from the upper bearing draining through passageway 58 in the link 114 to the oil space 56. Here again the outer bearing element, i. e., the bushing 23 is fixed to the support, and the inner bearing elements, i. e., the stud bolts are fixed to the shackle links, so that the load is sustained on the under side of the bearing.

Fig. 5 shows another modification in which shackle links 214 carry integral stud bolts 60 entering the bushing of spring eye 16. The link ends extend below the bolts and at their extremities are apertured to receive a connecting bolt 61 having a head 62 at one end and a lock nut 63 screwed onto its opposite threaded end. A spacer sleeve 64 encircles bolt 61 between the links, and shims 65 are interposed between one end of this sleeve and the face of the adjacent link 214. The ends of stud bolts 60 are spaced apart and an oil passage 66 in one stud bolt communicates at one end with a downflow bore 67 in the associated link 214 and delivers oil from its other end into the space 68 between the bolt ends. Here again the upper part of the shackle construction may be similar to that of Figs. 1 to 3 and again the desired loading of the two shackle bearings is effected so that oil tends to drain to the loaded areas thereof.

Figs. 6 to 8 inclusive illustrate another type of shackle embodying the invention and using tapered or conical bearings, self adjusting for wear, in place of the cylindrical bearings shown in Figs. 1 to 5. Here the upper shackle bolt 69 is of hollow pressed steel construction including a cylindrical intermediate portion drive fitted or otherwise fixed in a transverse bore 70 in the end of chassis frame bar 71 and tapered ends 72 entering tapered sockets 73 in the upper ends of the shackle links 74. These links are connected at their intermediate portions by cross bolt 75 and at their lower ends are formed with integral, inwardly presented, tapering stud bolts 76 entering the tapered ends of bushing 77 force fitted into spring eye 78.

The bushings 77 are externally cylindrical with their inner ends clamping a gasket 79 of gasket material between them and their outer ends flanged at 80 for reinforcement of the internal taper bearing surfaces, such reinforcing flanges being backed against the ends of spring eye 78 to resist outward belling or flaring under the influence of the stud bolts.

Means is associated with the connecting bolt 75 to exert an inward compression on the links 74, tending to draw them together and maintain a close fit at the taper bearings as wear occurs. The threaded end of bolt 75 passes through a suitable aperture in link 74 and receives a lock nut 81. The other enlarged end 75ª passes with some clearance through aperture 82 in the other shackle link. A strong tensioning washer 83 is interposed between the outer face of this link and a head 84 at the enlarged bolt end 75ª.

Thus in operation the tapered swivel bearings are always kept tight so that substantially no oil can escape from between them. The desirable conditions of eccentric under side loading of the bearings is attained. The inner bearing elements 72 of the upper bearings are fixed to load 71. The outer bearing elements 73 thereof are fixed relatively to the shackle link 74 and the load is at the under side of the bearing. At the lower swivel bearing the load supporting member 78 is fixed relatively the outer bearing elements 77 while the inner bearing elements 76 are fixed to the links, again assuring loading of the bearing at the side toward which lubricant normally tends to flow by gravity.

While other oiling systems might be employed I have shown this shackle equipped for lubrication from a central supply system. With this in view a drip plug 85 controlling flow from supply line 86 is screwed into the outer end of a diagonal passageway 87 in the frame 71. Passageway 87 terminates at the bore 70 and delivers through a slot 88 in bolt 69 to the hollow interior thereof oil running out through the open ends of the bolt into sockets 73 to lubricate the upper swivel joints 72—73. An angular passageway 89 drilled from the extremities of one of the links 74 has its ends plugged at 90 and conveys oil from an upper socket 73 into a longitudinal bore 95 in a lower stud bolt 76 from which the oil spills into the interior of bushings 77 and drains by gravity to the loaded surfaces of lower swivel bearings 76—77. The stud bolts 76 may be formed with external spiral grooves 91 to facilitate their lubrication. In order to prevent air blocking, the space between the stud bolts is vented, this vent preferably being through the stud bolt opposite the oil delivering one. It consists of a longitudinal bore 92 in the stud bolt extending from the inner end thereof to a vertical passageway 93 in the corresponding link. Passageway 93 is plugged at 94 at its lower end and vents through its top into the clearance space between bolt end 75 and the surrounding walls of aperture 82.

The form of invention shown in Figs. 9 and 10 is similar to that of Figs. 6 to 8 save for the lower bushing construction and venting arrangement. Here a one piece bushing 95 is force fitted into spring eye 88 and its interiorally tapered ends are backed throughout by the eye proper. Venting is accomplished by the provision of a radial port 98 in the top of the bushing communicating with an external annular groove 99 therein which vents through the usual gap 100 (Fig. 10) in the spring eye 88.

Fig. 11 shows a bushing structure exactly similar to that of Figs. 6 to 8 except that the venting arrangement of Figs. 9 and 10 is used in one of the bushing sections. Reference characters corresponding to those of Figs. 6 to 8 and 9 and 10 have therefore been applied.

Fig. 12 illustrates a more radical structural variation retaining the loading principle of the invention. Here a pair of steel bushing cups 101 have their cylindrical bottoms force fitted into the ends of spring eye 88, their flaring conical mouths 102 receiving stud bolts 103 integral with the shackle links 104. Lubricant from the upper bearing (not shown) drains through vertical passageways 105 in the links and through longitudinal bores 106 in the stud bolts into bushing cups 101 and drains to the under loaded sides of bearings 102—103. To prevent air blocking, openings 107 in the cup bottoms permit the air to escape into the space between the cup which communicates freely with the spring eye gap 100.

In Fig. 13 is illustrated a shackle embodying the invention and using spherical bearings at one swivel joint and cylindrical bearings at the other. Means is provided for taking up wear at the spherical bearings without resultant canting or injury to the cylindrical bearings.

Here the links include relatively light upper ends 108 formed with receiving sockets 109 for rounded ends 111 of hollow pressed bolt 110 force fitted into channel frame 71 and receiving lubricant from the passageway 87.

The relatively massive lower ends 112 of the links are formed with cylindrical stud bolts 113 entering a corresponding bushing 114' on spring eye 88. Lubricant flows from one socket 109 through link bore 115 to stud bolt bore 116 and thence between the stud bolt ends onto the surface of bushing 114' lubricating the lower swivel joint.

A headed, link-connecting bolt 117 passes with considerable clearance through the upper swivel bolt 110 and through apertures in the links, this bolt being held against endwise displacement by nut 118. At the top of the more rugged lower ends of the links 108, and well below the bolt 117 the links are formed with inwardly projecting, aligned, tapering, integral spacer sleeves 119 with shims 120 between them. Wear is taken up on the lower swivel bearing by removing one of these shims and tightening a tensioning bolt 121 extending through sleeves 119. This bolt is headed at one end and secured by nut 122 at its other. As the nut is tightened to draw the links together the lower ends of these links lying against the spring eye 88 approach and their lighter upper ends bend correspondingly. Thus the lower cylindrical swivel bearings 113—114 are not canted or jammed by the bending. Since the upper bearings are rounded, relative movement of the link axes and the upper bolt axis out of perpendicular does not affect the bearings. Clearance at the bolt 117 is adequate to accommodate for all necessary take-up or tensioning adjustments.

Here as is in all of the illustrated forms of the invention the lower sides of the swivel bearings sustain the load and permit oil flow by gravity to the loaded surfaces. In every case the load transmitting shackle proper is rigidly connected to the outer member of the load swivel joint and to the inner member of the support swivel joint. Similarly the load is always fixed to the inner or male element of its swivel joint while the support is always fixed to the outer or female element of its swivel joint or bearing, whereby the desired loading of the bearing is attained.

The shackles shown here are of the compression type but the application of the invention to tension shackles is accomplished by use of the same relation of load and support and shackle to the respective male and female bearing members.

The manner in which the principles of the present invention are applicable to tension shackles may be readily observed by simply viewing the illustrated embodiments of the invention in inverted position, as if the frame were hung from the spring and noting that when so considered the desired under side loading is maintained. In viewing the illustrated shackles in inverted position it will, of course, be obvious that in some instances the lubricant ducts and inlets would be arranged to permit the oil from the lower bearing to well up therein and lubricate the upper bearings, as for instance in my prior Patent No. 1,618,122 of February 15, 1927.

It will be apparent that considered from its broader aspects, many features of this invention are entirely independent of any special lubricating apparatus or method and of general utility in various analagous types of structure.

It is to be understood that the invention of the present application as specified in the accompanying claims may be employed in the lubrication of bearings other than chassis bearings, and/or to the lubrication of other chassis bearings than shackle bearings and also may be employed generally in shackle construction, even though lubricated in other ways than shown and described in the specification.

I claim:

1. A load transmitting member adapted to couple a load to its support in such a manner that the load and support are bodily movable relatively to each other, said load transmitting member being swivelly connected at spaced points to the load and support respectively with the axes of both swivel bearings in substantially horizontal planes and with the point of connection to the load being more elevated than the point of connection to the support, means to lubricate both bearings, and the bearings being so arranged relatively to the coupling member the load and the support that the under side of each bearing is the loaded side thereof, both of said swivel connections including inner and outer bearing elements, the outer elements of the swivel connection to the load embracing the outer ends of the inner element and the inner element being rigidly connected to the support between said outer bearing elements.

2. A load transmitting member adapted to couple a load to its support in such a manner that the load and support are bodily movable relatively to each other, said load transmitting member being swivelly connected at spaced points to the load and support respectively with the axes of both swivel bearings in substantially horizontal planes, the swivel connection to the load being substantially above the swivel connection to the support, means to lubricate both bearings, the bearings being so arranged relatively to the coupling member the load and the support that the load is transmitted to the support through that side of each bearing toward which lubricant normally tends to flow, both of said swivel connections including inner and outer bearing elements, the outer elements of the swivel connection to the load embracing the outer ends of the inner element and the inner element being rigidly connected to the support between said outer bearing elements.

3. A load transmitting member adapted to couple a load to its support in such a manner that the load and support are bodily movable relatively to each other, said load transmitting member being swivelly connected at spaced points to the load and support respectively, each bearing sustaining the load principally on one side thereof, the lubricating means being so designed and the bearings being so arranged and lubricated that the preferential tendency of the lubricant is to flow toward the loaded portion of each bearing rather than toward the unloaded portions thereof, said swivel connections being each provided with inner and outer swivel elements and being positioned vertically above each other, said load transmitting member including the outer elements of the upper connection and the inner element of the lower connection.

4. A device of the class described comprising a load transmitting portion adapted for interposition between and for swivelled connection at spaced points with a load and support respectively, said swivelled connections being made at two spaced points to the load and at one or two points to the support, each swivel bearing including male and female members cooperatively providing bearing surfaces, the load being fixed relatively to the male element of one bearing and the support being fixed relatively to the female portion of the other bearing.

5. A device of the class described comprising a load transmitting portion adapted for interposition between and for swivelled connection at spaced points with a load and support respectively, each swivel bearing including male and female members cooperatively providing bearing surfaces, the load being fixed relatively to the male element of one bearing and the support being fixed relatively to the female portion of the other bearing, means to lubricate the bearings including a lubricant duct discharging into the male element of the bearing which is fixed to the load to feed the bearing of said male element and means to convey overflow from such bearing to the bearing which is associated with the support.

6. A device of the class described comprising a load transmitting portion adapted for interposition between and for swivelled connection at spaced points with a load and support respectively, each swivel bearing including male and female members cooperatively providing bearing surfaces, the load being fixed relatively to the male element of one bearing and the support being fixed relatively to the female portion of the other bearing, the other elements of said bearings being fixed relatively to the load transmitting portion of said device, said bearings being so positioned as to put said load transmitting portion under compression.

7. A device of the class described comprising a load transmitting portion adapted for interposition between and for swivelled connection at spaced points at different levels with a load and support respectively, each swivel bearing including male and female members cooperatively providing bearing surfaces, the load being fixed relatively to the male element of one bearing and the support being fixed relatively to the female portion of the other bearing, the male elements comprising bolts and the female elements comprising bushings for the bolts, the female element of the upper bearing and the male element of the lower bearing being rigid with the load transmitting portion.

8. A device of the class described comprising a load transmitting portion adapted for interposition between and for swivelled connection at spaced points with a load and support respectively, each swivel bearing including male and female members cooperatively providing bearing surfaces, the load being fixed relatively to the male element of one bearing and the support being fixed relatively to the female portion of the other bearing, the male elements comprising bolts and the female elements comprising sleeves encircling the bolts, the load swivel bearing being provided with a plurality of female elements and with a single male element.

9. A spring shackle including a pair of links, male and female cooperating bearing elements defining bearings adapted to swivelly connect the links to a supporting spring and a load respectively, the links being fixed relatively to the female elements of one bearing and the male element of the other, said links with said male element forming a rigid U-shaped member, the female elements being formed by openings in the ends of said links removed from the base of said U.

10. A spring shackle including a load transmitting portion, male and female bearing elements defining bearings adapted to swivelly connect the load transmitting portion to a supporting spring and a load respectively, the load transmitting portion being fixed relatively to the female element of one bearing and the male element of the other, the female element of the upper bearing and the male element of the lower bearing being rigid with the load transmitting portion.

11. A spring shackle for sustaining the load of a vehicle frame upon a spring, the shackle including a load transmitting portion and swivel bearings connecting such portion at vertically spaced points to the frame and spring respectively and also at laterally spaced points to said frame, each swivel bearing including a bushing and a pin, the bearing which connects the load transmitting element to the frame having its bushing fixed to the load transmitting element and its pin fixed to the frame.

12. A vertical U-shaped spring shackle element including a rigid load transmitting unit adapted for swivelled connection at spaced points to a load and to a support and also at laterally spaced points to said load, the shackle having a male bearing element rigid therewith forming the bottom of the U for coaction with a female bearing element on the support and having female bearing elements rigid therewith formed in the ends of the legs of the U for coaction with a male element on the load.

13. A load transmitting compression spring shackle adapted to movably connect a vehicle frame to a supporting spring, the shackle including a pair of spaced compression links, a bolt connecting and rigid with the links at one end and adapted for reception in a bushing fixed in the spring, and bushing means rigid with the other ends of the links and adapted to receive a bolt fixed to the frame.

14. A load transmitting spring adapted to movably connect a vehicle frame to a supporting spring, the shackle including a pair of spaced links, a bolt connecting and rigid with the links at one end and adapted for reception in a bushing fixed in the spring, bushing means rigid with the other ends of the links and adapted to receive a bolt fixed to the frame, means to lubricate the shackle including an oil inlet in the frame feeding into the interior of the fixed frame bolt, means to lubricate the bushings of said bolt from the interior thereof and means to oil the other bolt and bushing by overflow from the fixed frame bolt bearing.

15. In vehicle construction, a frame and a supporting spring, a bolt having its intermediate portion fixed in the frame and its ends projecting therebeyond, a shackle including links each having a bushing fixed in one end for coaction with the projecting ends of the bolt, a second bolt rigidly connecting the opposite ends of the link and an eye at the end of the spring having a bushing fixed therein for the reception of said second mentioned bolt.

16. In vehicle construction, a frame and a supporting spring, a bolt having its intermediate portion fixed in the frame and its ends projecting therebeyond, a shackle including links each having a bushing fixed in one end for coaction with the projecting ends of the bolt, a second bolt rigidly connecting the opposite ends of the link, an eye at the end of the spring having a bushing fixed therein for the reception of said second mentioned bolt each of the bolts having internal lubricant ducts therein, means for conveying lubricant from said ducts to the bearing portions of the bolts, means to supply lubricant to the interior of one bolt and means including a passageway in one of the links to supply the interior of the other bolt by over-flow from the first one.

17. In a spring shackle a pair of links connected at their lower ends with a bolt for swivelled connection at one end with a load support and at their upper ends having bushings therein for coaction with a bolt fixed to the load.

18. A shackle including spaced rigid links swivelly connected at their upper ends to a load and a bolt rigid with the lower ends of the links and adapted to enter a bushing in a load support.

19. A shackle including spaced rigid links swivelly connected by sockets formed on the interior opposite faces thereof at one end to a load and including integral stud bolt portions at their other ends adapted to enter a suitable bushing in a load support.

20. A shackle including spaced rigid links swivelly connected by sockets formed on the interior opposite faces thereof at one end to a load and including integral stud bolt portions at their other ends adapted to enter a suitable bushing in a load support and the stud bolts being hollow and a link connecting bolt passed through them.

21. A shackle including spaced rigid links swivelly connected by sockets formed on the interior opposite faces thereof at one end to a load and including integral stud bolt portions at their other ends adapted to enter a suitable bushing in a load support, shims between the abutting ends of the stud bolt and adjustable means to hold the stud bolt ends against the shims.

22. A spring shackle including a pair of links, swivelly connected by sockets formed on the interior opposite faces thereof to a vehicle frame and bearing studs on the links adapted to enter a bushing in the eye of a vehicle spring.

23. A spring shackle including a pair of links, swivelly connected by sockets formed on the interior opposite faces thereof to a vehicle frame stud bolts on the links adapted to enter a bushing in the eye of a vehicle spring, and means to tie the links together including a tie bolt connecting them adjacent the spring eye swivel joint.

24. A spring shackle including a pair of links, swivelly connected by sockets formed on the interior opposite faces thereof to a vehicle frame, stud bolts on the links adapted to enter a bushing in the eye of a vehicle spring, and means to tie the links together including a tie bolt connecting them adjacent the spring eye swivel joint, said tie bolt being arranged externally of the spring eye and having adjustable wear means associated therewith.

25. A spring shackle connecting the links to a load and load support respectively, the swivel joint at the load support including male elements fixed to the links and a female element fixed to the support, the swivel joint at the load including a male bearing means fixed to load, a complementary female bearing means fixed to the links, one swivel joint having spherical bearings and the other swivel joint having cylindrical bearings and means to take up wear at the cylindrical bearing while maintaining the spherical bearing in operative relation.

26. A spring shackle connecting the links to a load and load support respectively, the swivel joint at the load support including male elements fixed to the links and a female element fixed to the support, the swivel joint at the load including a male bearing means fixed to load, a complementary female bearing means fixed to the links, one swivel joint having spherical bearings and the other swivel joint having cylindrical bearings, and the cylindrical bearing including stud bolts fixed to the links and entering a bushing in the support, and a tie bolt connecting the links.

27. A spring shackle connecting the links to a load and load support respectively, the swivel joint at the load support including male elements fixed to the links and a female element fixed to the support, the swivel joint at the load including a male bearing means fixed to load, a complementary female bearing means fixed to the links, one swivel joint having spherical bearings and the other swivel joint having cylindrical bearings, and the cylindrical bearing including stud bolts fixed to the links and entering a bushing in the support, a tie bolt connecting the links, the links being so constructed that when the tie bolt is tightened to take up wear on the cylindrical bearings, the cupped ends of the links at the spherical bearings will remain in effective bearing relation with the spherical bolt ends, the corresponding lengths of links flexing for this purpose.

28. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T.

29. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the U-shaped shackle being split and the split portions of the bottom thereof being held together within the ends of the spring eye.

30. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the interior sides of the U-shaped shackle adjacent the ends of its legs being provided with sockets which fit upon and encircle the ends of the cross member of said T, said lubricant passing from said T cross member across said bearing into said socket.

31. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the U-shaped shackle being split at its bottom and the split U-shaped shackle being held together by a transverse bolt parallel to the bottom of the U and passing through the sides of the U.

32. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the U-shaped shackle being split at its bottom and the split U-shaped shackle being held together by a transverse bolt parallel to the bottom of the U and passing through the sides of the U between the cross member of the T and the bottom of the U-shaped shackle.

33. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the U-shaped shackle being split at its bottom and the split U-shaped shackle being held together by a transverse bolt parallel to the bottom of the U and the sides of said U having extensions below the bottom of the U through which said transverse bolt passes.

34. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the ends of the cross member of the T being made of hemispherical shape and the interior sides of the legs of the U-shaped shackle being provided with hemispherical sockets to bear upon the ends of the cross member of the T.

35. In a motor vehicle having a chassis frame with an inverted T rigid therewith, a supporting spring with a terminal eye parallel to the cross member of said T and a U-shaped shackle bearing within said eye at its bottom and at the ends of the cross member of the T at its top; a lubricating installation comprising means to admit lubricant to the horizontal portion of the T and lubricant conduit means through the side and bottom of the U-shaped shackle, the lubricant passing across the bearing surface between the top of the U-shaped shackle and the end of the T, the horizontal portion of the T and the bottom of the U-shaped shackle being provided with parallel axial lubricant passages and one of the sides of the U-shaped shackle being provided with a bore to permit flow of lubricant from the axial passageway in the horizontal T portion to the axial passageway in the bottom of the U-shaped shackle.

JOSEPH BIJUR.